(12) United States Patent
Mooren (10) Patent No.: US 10,670,801 B2
(45) Date of Patent: Jun. 2, 2020

(54) ILLUMINATED DRAIN STOPPER

(71) Applicant: Kohler Co., Kohler, WI (US)

(72) Inventor: Brian J. Mooren, Sheboygan Falls, WI (US)

(73) Assignee: KOHLER CO., Kohler, WI (US)

(*) Notice: Subject to any disclaimer, the term of this patent is extended or adjusted under 35 U.S.C. 154(b) by 145 days.

(21) Appl. No.: 15/829,021

(22) Filed: Dec. 1, 2017

(65) Prior Publication Data
US 2018/0156969 A1 Jun. 7, 2018

Related U.S. Application Data

(60) Provisional application No. 62/430,711, filed on Dec. 6, 2016.

(51) Int. Cl.
| | | |
|---|---|---|
| *F21V 8/00* | (2006.01) | |
| *F21V 3/00* | (2015.01) | |
| *F21V 31/00* | (2006.01) | |
| *E03C 1/23* | (2006.01) | |
| *F21S 9/02* | (2006.01) | |
| *F21V 33/00* | (2006.01) | |
| *F21V 17/12* | (2006.01) | |
| *E03C 1/14* | (2006.01) | |
| *F21Y 115/10* | (2016.01) | |

(52) U.S. Cl.
CPC .............. *G02B 6/0096* (2013.01); *E03C 1/23* (2013.01); *E03C 1/2302* (2013.01); *F21S 9/02* (2013.01); *F21V 3/00* (2013.01); *F21V 31/005* (2013.01); *F21V 33/004* (2013.01); *E03C 1/14* (2013.01); *F21V 17/12* (2013.01); *F21Y 2115/10* (2016.08)

(58) Field of Classification Search
CPC .................................................... G02B 6/0096
USPC ...................................... 4/680–694; 362/101
See application file for complete search history.

(56) References Cited

U.S. PATENT DOCUMENTS

| | | | |
|---|---|---|---|
| 4,911,492 A | 3/1990 | Ward | |
| 5,662,404 A | 9/1997 | Susat | |
| 6,502,976 B1* | 1/2003 | Bernhard | F21S 9/02 |
| | | | 362/190 |
| 6,886,958 B1* | 5/2005 | Grant | E03C 1/18 |
| | | | 362/101 |
| 7,008,073 B2 | 3/2006 | Stuhlmacher, II et al. | |
| 7,434,960 B2 | 10/2008 | Stuhlmacher, II et al. | |
| 8,337,033 B2 | 12/2012 | Kaneda et al. | |
| 2005/0276039 A1 | 12/2005 | Hillenbrand | |
| 2006/0152917 A1 | 7/2006 | Stuhlmacher, II et al. | |

FOREIGN PATENT DOCUMENTS

| | | |
|---|---|---|
| CN | 102400485 | 4/2012 |
| WO | WO2005/064231 | 7/2005 |

OTHER PUBLICATIONS

Dornbracht Article No. 10731970—Electronic Pop-Up Drain for Kitchen Sink;3 pages.

* cited by examiner

*Primary Examiner* — Lauren A Crane
(74) *Attorney, Agent, or Firm* — Foley & Lardner LLP (57) ABSTRACT

An illuminated drain stopper includes a body having an upper end and a lower end, and a light pipe disposed at the upper end of the body. The light pipe is configured to transfer light from a light source within the body to an outer periphery of the light pipe.

20 Claims, 8 Drawing Sheets

ILLUMINATED DRAIN STOPPER

CROSS-REFERENCE TO RELATED PATENT APPLICATION

This application claims the benefit of and priority to U.S. Provisional Patent Application No. 62/430,711, filed Dec. 6, 2016, which is incorporated by reference herein in its entirety.

BACKGROUND

The present application relates generally to the field of drain stoppers, and more specifically to an illuminated drain stopper.

When a person wishes to use a bathroom at night, turning on an overhead light may not be desirable for a variety of reasons. For example, the overhead light may disturb others in the vicinity who may be sleeping. The overhead light may also be brighter than is necessary under the circumstances, and may create discomfort for the user and/or may create a sensation of "daytime" to the user, making it difficult for the user to return to sleep. Additionally, the overhead light may illuminate more areas than are necessary to accomplish the task at hand.

Some users may use night lights to provide some visibility to the bathroom space when it is dark. Conventional night lights may be plugged into an outlet in the bathroom. Therefore, placement of these night lights are limited to wherever an outlet is located in the bathroom. Accordingly, conventional night lights either may not illuminate a desired area (e.g., within a sink), or may illuminate a smaller area than necessary. Further, by requiring in the use of an outlet, the night light reduces the number of available outlets in a bathroom for use with appliances. Accordingly, these night lights are restricted in their location and localized light output, and do not assist a person in finding or using a specific fixture (i.e., a sink) in the bathroom at night.

SUMMARY

One embodiment relates to an illuminated drain stopper that includes a body having an upper end and a lower end and a light pipe disposed at the upper end of the body. The light pipe is configured to transfer light from a light source within the body to an outer periphery of the light pipe.

Another embodiment relates to an illuminated drain stopper that includes a body having an upper end and a lower end, the body defining a cavity therein, and a light pipe disposed at the upper end of the body. The light pipe is configured to transfer light from a light source within the body to an outer periphery of the light pipe. The drain stopper further includes a seal disposed between the light pipe and the body, with the seal forming a watertight connection therebetween.

Another embodiment relates to a sink drain assembly that includes a sink basin defining a drain, and a drain stopper disposed therein. The drain stopper includes a body and a light pipe disposed at an upper end of the body. The light pipe is configured to transfer light from a light source in the body to an outer periphery of the light pipe, and a cover disposed at an upper surface of the light pipe opposite the body. The light pipe is configured to reflect light laterally outward toward the sink basin, and the cover is configured to prevent light from reflecting upward into the sink basin.

DETAILED DESCRIPTION

Referring generally to the FIGURES, an illuminated drain stopper is shown according to an exemplary embodiment. The drain stopper may operate as a night light that illuminates an interior portion of a sink or lavatory, thus improving the use of the sink at night while allowing the user to avoid having to turn on an overhead light in a bathroom or to rely on night lights plugged into outlets disposed in the vicinity of the sink. Advantageously, the illuminated drain stopper allows for illumination of the sink while keeping nearby outlets free for other uses.

Figure 1:
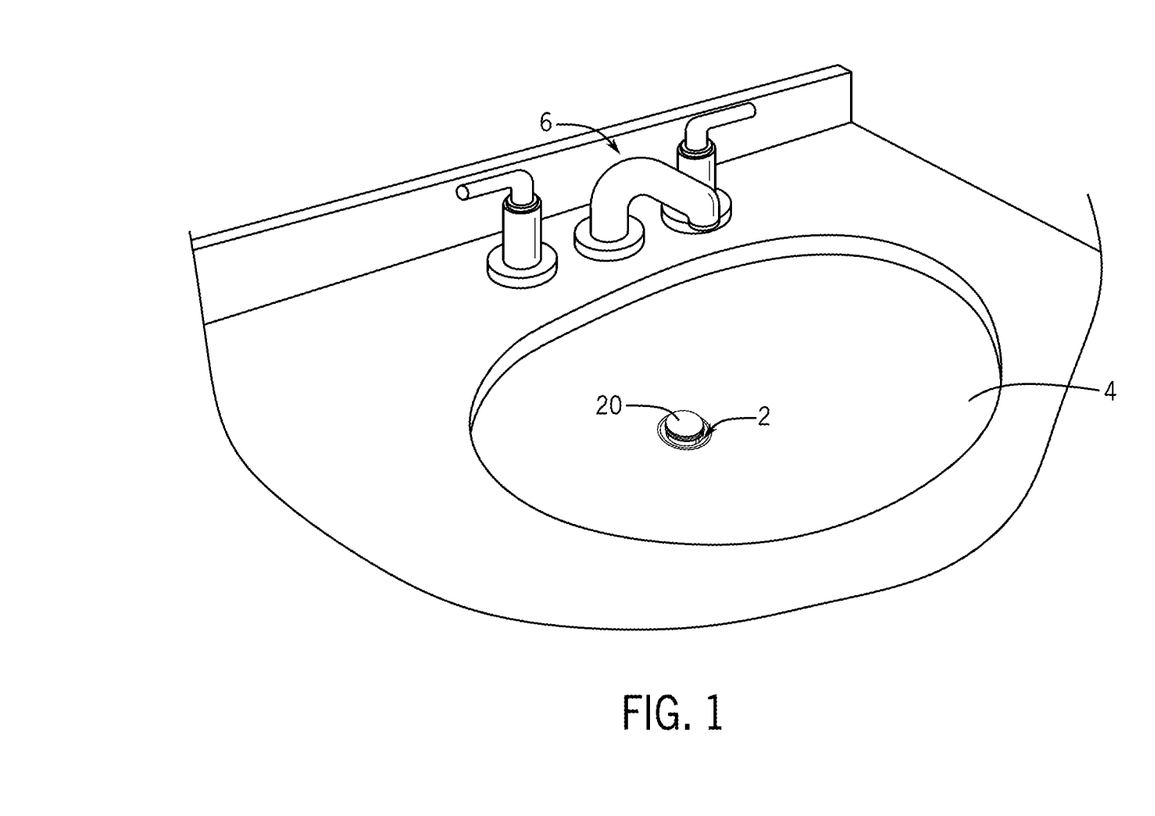
FIG. 1 shows an drain stopper installed in a sink according to an exemplary embodiment.
Figure 2:
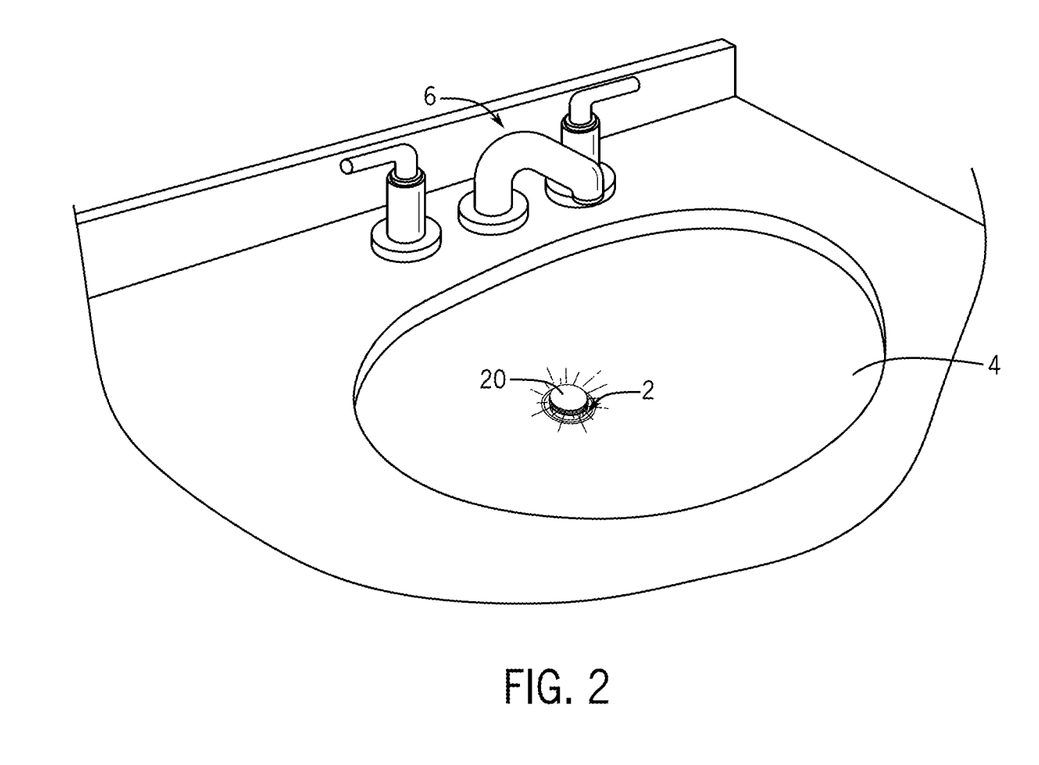
FIG. 2 shows the drain stopper of FIG. 1 generating light reflecting off of the sink, according to an exemplary embodiment.

Referring to FIGS. 1 and 2, a drain stopper 20 is installed in a drain 2 at a lower portion of a sink 4 (i.e., sink basin). The drain stopper 20 may have the appearance of a conventional drain stopper when installed in the sink and not illuminated. As shown in FIG. 2, when the drain stopper 20 is illuminated, light emanates from an upper portion thereof to illuminate a portion of the sink 4 proximate to the drain 2. According to another exemplary embodiment, the drain stopper 20 may provide ambient light to other portions of a room (e.g., bathroom) in which the sink 4 is installed. The light from the drain stopper 20 may allow a user to find and operate a faucet 6 in dim or no-light conditions. The light may further provide ample light to allow a user to navigate around the room in such conditions. Use of the drain stopper 20 as a night light may result in access to additional outlets within the bathroom that would otherwise be occupied by a night light. Furthermore, the light emanating from the drain stopper 20 may be substantially contained within the sink 4 or other fixture, such that the entire room is not illuminated by the drain stopper 20. In this configuration, navigation and use of the sink 4 or other fixture is improved without resulting in excessive light that may disturb either the user or others in the immediate vicinity. While the drain stopper 20 is shown installed in a sink basin 4, according to other exemplary embodiments, the drain stopper 20 may be installed in drains for other fixtures (e.g., shower, tub, etc.).

Figure 3:
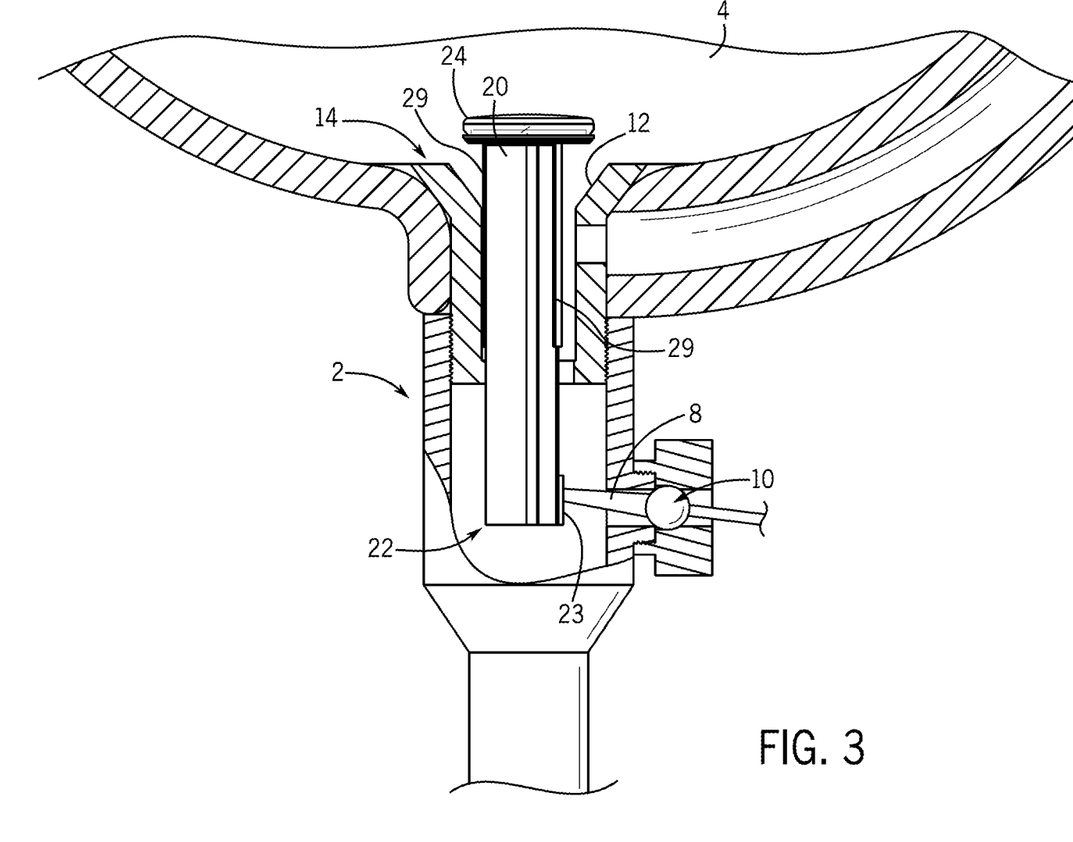
FIG. 3 is a cross-section view of an illuminated drain stopper installed in a drain of a sink, according to an exemplary embodiment.

Referring now to FIG. 3, the drain stopper 20 is shown installed in the drain 2 of the sink 4 according to an exemplary embodiment. A valve stem 8 of a ball-type control mechanism 10 extends into the drain 2 and engages the drain stopper 20 proximate to a lower end 22 thereof. The valve stem 8 is configured to rotate, such that the drain stopper 20 moves vertically within the drain 2 when the valve stem 8 is articulated. An inset portion 23 is defined at the lower end 22 of the drain stopper 20, and the valve stem 8 is received in the inset portion 23. According to an exemplary embodiment, the valve stem 8 may be coupled to the drain stopper 20 at the inset portion 23. According to another exemplary embodiment, the valve stem 8 engages but is not coupled to the drain stopper 20 at the inset portion 23, such that the force from the valve stem 8 raises the drain stopper 20 when the valve stem 8 is rotated to the raised configuration (e.g., clockwise in FIG. 3), but the force of gravity causes the drain stopper 20 to lower when the valve stem 8 is rotated to the lowered configuration (e.g., counterclockwise in FIG. 3).

The drain stopper 20 is configured to sealingly engage a drain opening 12 at an upper end 14 of the drain 2. For example, the drain stopper 20 defines a shoulder 26 at an upper end 24 thereof, the shoulder 26 having a diameter substantially the same as or greater than a diameter of the drain opening 12. The valve stem 8 may be remotely controlled such that the valve stem 8 moves the drain stopper 20 between an open (i.e., first, raised, etc.) position and a closed (i.e., second, lowered, etc.) position. In the open position, the shoulder 26 is spaced apart from the drain opening 12, such that water or other fluid can flow therebetween. In the closed position, the shoulder 26 is disposed proximate to (e.g., on top of) and sealingly engages the drain opening 12, such that water or other fluid is prevented from flowing therebetween. The drain stopper 20 may be configured to illuminate the sink 4 in both the open and closed positions. According to another exemplary embodiment, the drain stopper 20 may be configured to illuminate the sink 4 in the open position, but not in the closed position (or vice-versa).

Figure 4:
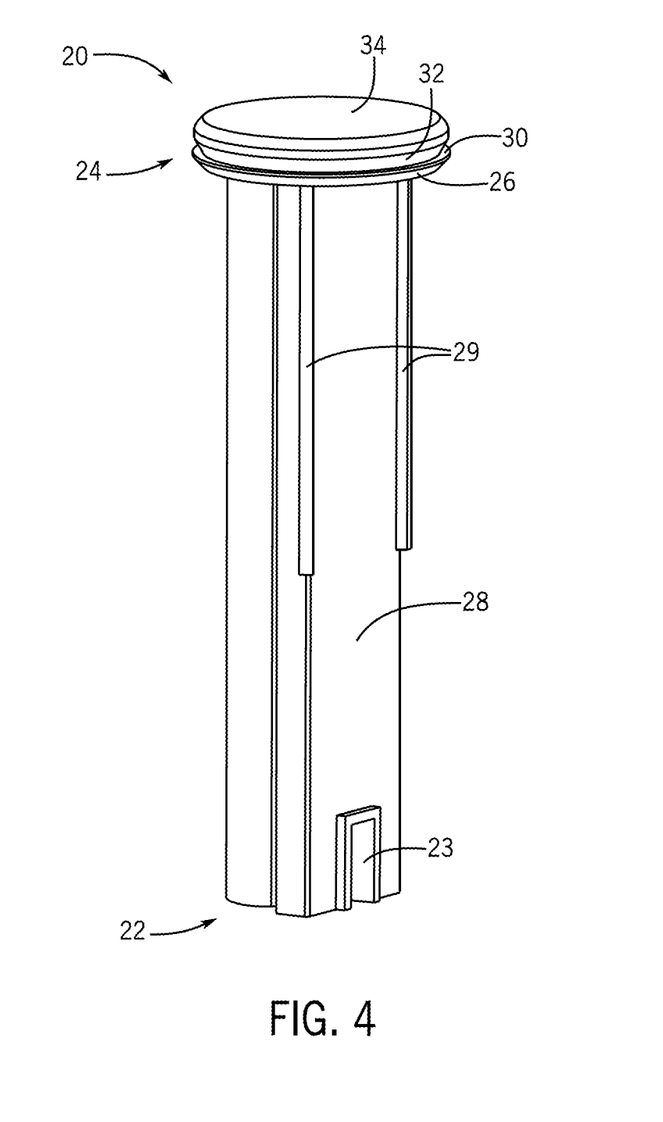
FIG. 4 is a perspective view of an illuminated drain stopper, according to an exemplary embodiment.

Referring now to FIG. 4, the drain stopper 20 includes a body 28, a seal 30, a light pipe 32, and a cover 34. The body 28 is configured to be received in the drain 2. For example, a plurality of ribs (i.e., gussets) 29 extend vertically along the body 28 and are configured to engage walls of the drain 2, such that the body 28 is offset from the walls and the drain stopper 20 is substantially centered in the drain 2. The body 28 is substantially cylindrical, extending from the upper (i.e., first) end 24 to the lower (i.e., second) end 22. The shoulder 26 extends laterally outward proximate to the upper end 24 and receives the seal 30 thereon. The seal 30 may be formed from rubber or another compressible material capable of forming a seal between the drain stopper 20 and the drain 2 or drain opening 12. The light pipe 32 is disposed on top of the seal 30 and is configured to transfer light out to the sink 4 from within the body 28. The cover 34 is disposed on top of the light pipe 32 and covers substantially all of an upper surface 35 of the light pipe 32, such that sides of the light pipe 32 are exposed to the sink 4, but a top of the light pipe 32 is not exposed to the sink 4. In this configuration, light may emanate laterally from the drain stopper 20, but not upward therefrom. The cover 34 prevents excessive light from illuminating the room and may provide improved aesthetics with a ring of light formed in the sink 4 proximate to the drain opening 12. According to other exemplary embodiments, the drain stopper may have other configurations that are intended to allow additional light to illuminate an area beyond the sink or other fixture in which the drain stopper is installed.

Figure 5:
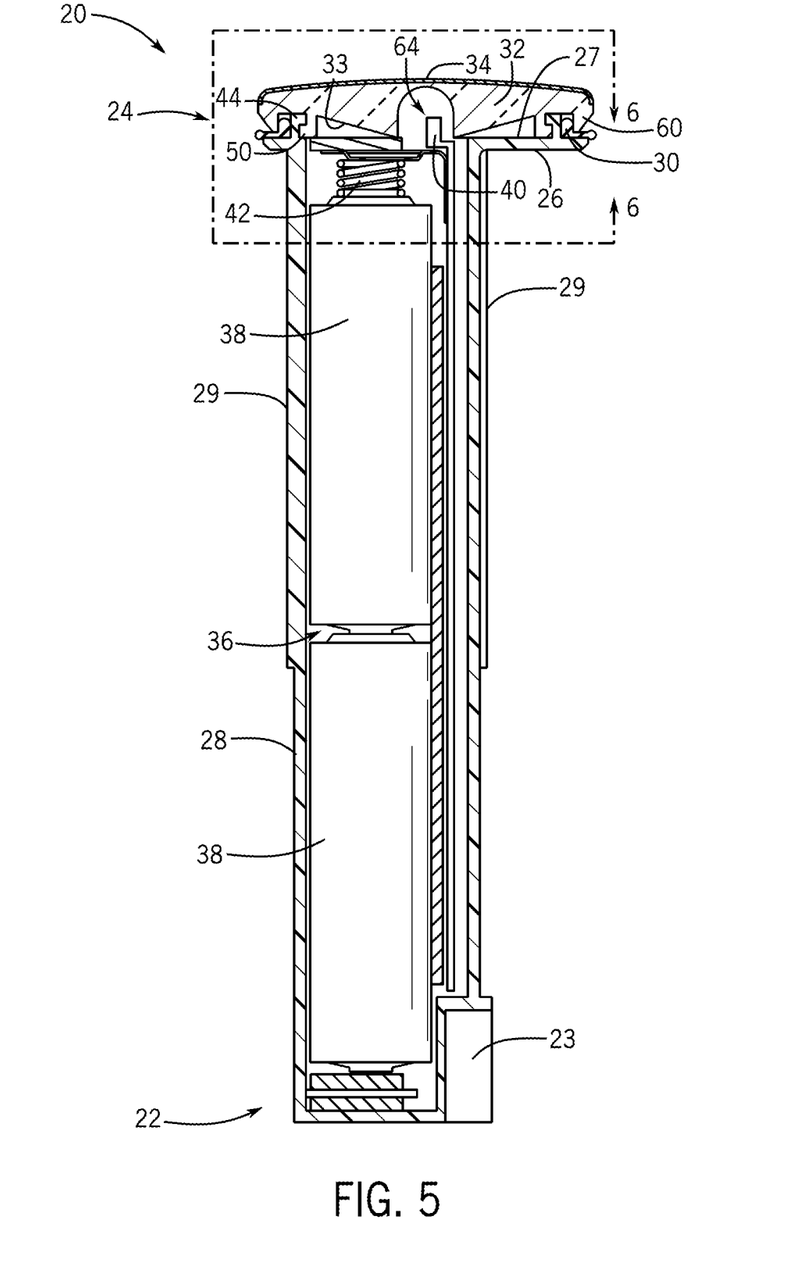
FIG. 5 is a cross-section view of an illuminated drain stopper, according to an exemplary embodiment.
Figure 6:
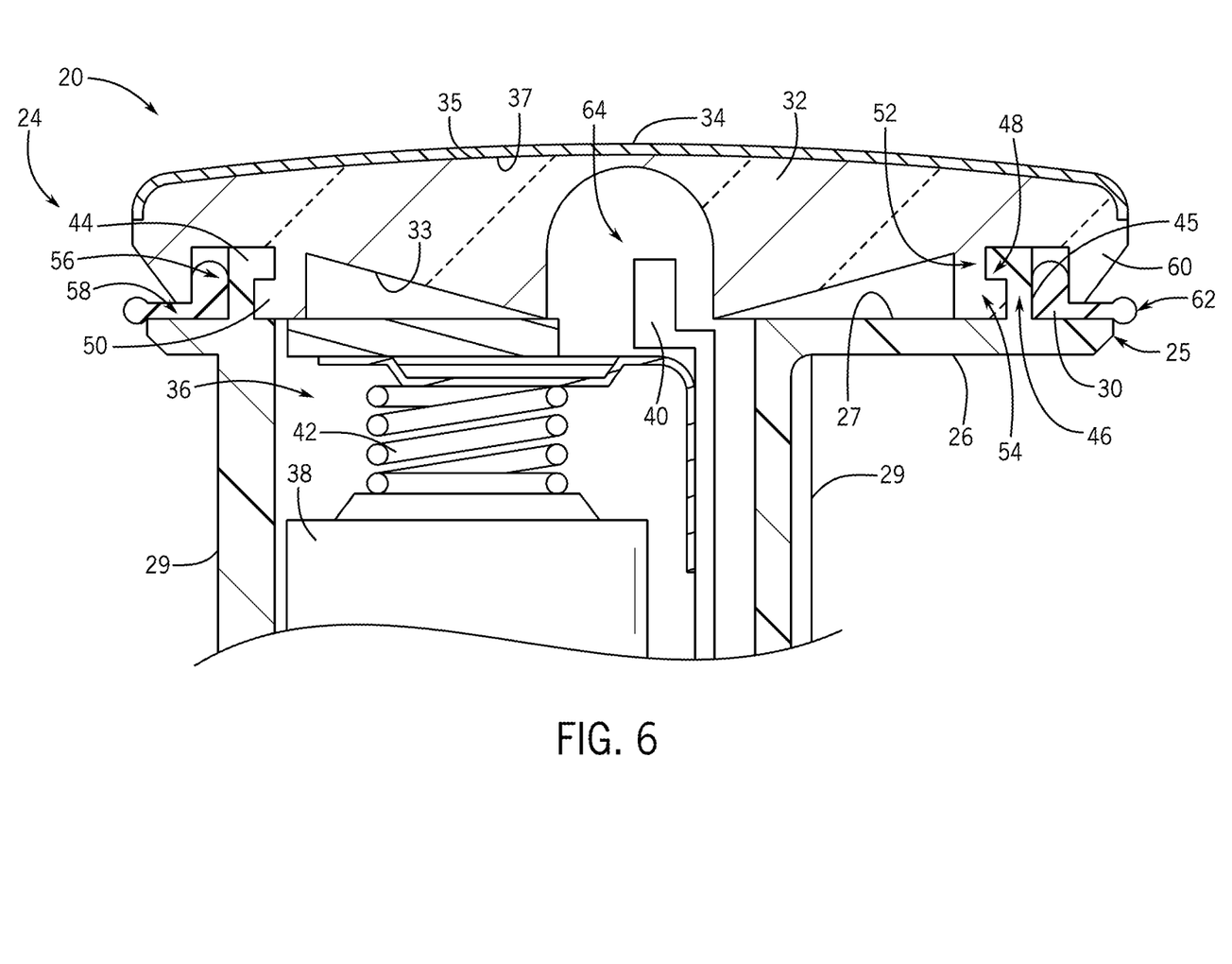
FIG. 6 is a close-up view of a portion of the illuminated drain stopper taken along line 6-6 of FIG. 5.

Referring now to FIGS. 5 and 6, a cross-section of the drain stopper 20 is shown according to an exemplary embodiment. The body 28 defines a cavity 36 therein. The cavity 36 is configured to house (e.g., enclose) a battery or batteries 38 (e.g., AA, AAA, C, D, button cell batteries, etc.) for providing electricity to a light source 40 disposed proximate the upper end 24. The batteries 38 may be rechargeable or non-rechargeable. According to an exemplary embodiment, the light source 40 is one or more light emitting diodes ("LEDs"). According to other exemplary embodiments, the light source 40 may include other sources of light as are now known or that may be developed in the future. The light pipe 32 may be removably coupled to the body 28, such that when the light pipe 32 is removed, access is provided to the cavity 36. The seal 30 is disposed between the shoulder 26 and the light pipe 32, providing sealing (i.e., watertight) engagement therebetween. According to an exemplary embodiment, the seal 30 advantageously prevents water or other fluid from entering the cavity 36 by passing between the body 28 and the light pipe 32 and disrupting or damaging the electrical components contained therein.

When the light pipe 32 is installed on the body 28, the cavity 36 is enclosed, and the batteries 38 are electrically engaged to form a circuit with the light source 40. For example, a spring 42 may be disposed at an end of the cavity 36 for electrically engaging the batteries 38, such that the spring 42 is substantially uncompressed when the light pipe 32 is not installed on the body 28 and is substantially compressed when the light pipe 32 is installed on the body 28. In this configuration, the installation of the light pipe 32 ensures a consistent electrical connection with the batteries 38. According to another exemplary embodiment, the spring 42 is disposed on the light pipe 32, such that the spring 42 is compressed and electrically engages the batteries and other circuitry when the light pipe 32 is positioned on and/or coupled to the body 28. In this configuration, the circuit may be incomplete when the light pipe 32 is removed from the body 28.

According to another exemplary embodiment, a battery pack assembly may be received in the cavity 36. The battery pack assembly may include one or more batteries 38, the light source 40 and other components (e.g., spring, timer, etc.) forming a lighting mechanism 70, discussed below, for activating the light source 40. In this configuration, the battery pack assembly may be completely removable from the cavity 36 such that the lighting mechanism 70 can be activated before the battery pack assembly is inserted into the cavity 36. The batteries 38 may be replaced by removing substantially the entire battery pack assembly from the cavity 36 before removing the batteries 38. Similarly, a cycle operated by the lighting mechanism 70 may be re-set by removing the battery pack assembly from the cavity 36 and removing and replacing at least one battery 38 from the battery pack assembly.

A body catch 44 (i.e., projection, receiving member, etc.) extends vertically upward from the shoulder 26 and is configured to receive the light pipe 32 with an interference fit. For example, a cross-sectional view of the body catch 44 may be substantially "L" shaped with a first (i.e., vertical) portion 46 extending substantially perpendicular to and away from an upper surface 27 of the shoulder 26, and a second (i.e., lateral) portion 48 extending substantially perpendicular to and away from the first portion 46. The light pipe 32 includes a complementary feature for engaging the body catch 44. For example, the light pipe 32 may include a light pipe catch 50 extending vertically downward from the light pipe 32. A cross-sectional view of the light pipe catch 50 may be substantially "L" shaped with a first (i.e., vertical) portion 52 extending substantially perpendicular to and away from a lower surface 33 of the light pipe 32, and a second (i.e., lateral) portion 54 extending substantially perpendicular to and away from the first portion 52. Of course, according to other exemplary embodiments, the body catch may have other suitable configurations, all of which are intended to be within the scope of the concepts disclosed herein.

As shown in FIG. 5, the second portion 48 of the body catch 44 extends toward an inner portion of the body 28 and the second portion 54 of the light pipe catch 50 extends toward an outer periphery of the light pipe 32. In this configuration, the light pipe catch 50 (i.e., the first portion 52) defines a diameter that is less than a diameter of the body catch 44 (i.e., the first portion 46). The light pipe catch 50 is then received by the body catch 44 at an interior portion thereof. According to another exemplary embodiment, the second portion 48 of the body catch 44 extends toward an outer periphery of the shoulder 26 and the second portion 54 of the light pipe catch 50 extends toward an inner portion of the light pipe 32. In this configuration, the light pipe catch 50 (i.e., the first portion 52) defines a diameter that is greater than the diameter of the body catch 44 (i.e., the first portion 46). The light pipe catch 50 is then received by the body catch 44 at an outer portion thereof. According to other exemplary embodiments, the light pipe 32 may be coupled to the body 28 in other ways. For example, the light pipe 32 may be threadably received by the body 28, such that each of the body catch 44 and light pipe catch 50 define threads. At least one of the light pipe 32 and the body 28 may be formed from a partially-deformable material, such that either one or both of the body catch 44 and the light pipe catch 50 is configured to deform (i.e., flex) to engage the other.

Each of the shoulder 26 and the body catch 44 may be substantially circular to correspond to a shape of the body 28. As shown in FIG. 6, the seal 30 forms a substantially "L" shaped cross section. When the seal 30 is received on the shoulder 26, an upper (i.e., first) portion 56 of the seal 30 extends vertically upward along the first portion 46 of the body catch 44, and a lower (i.e., second) portion 58 of the seal 30 extends substantially laterally outward along the shoulder 26 toward the outer periphery 29 thereof. The seal 30 may be substantially circular and engage the shoulder 26 and an outer surface 45 of the body catch 44 at all points along its inner circumference. The light pipe 32 defines a flange 60 extending downward from the lower surface 33 at an outer periphery thereof. The flange 60 is spaced apart from the light pipe catch 50, such that the body catch 44 and the upper portion 56 of the seal 30 are received therebetween. The light pipe catch 50 extends further from the lower surface 33 than the flange 60 extends, such that the second portion 54 of the light pipe catch 50 is configured to engage the shoulder 26, but the flange 60 is spaced apart from the shoulder 26 and configured to receive the lower portion 58 of the seal 30 therebetween.

The upper portion 56 of the seal 30 may define a thickness greater than the space between an inner diameter of the flange 60 and an outer diameter of the body catch 44 (e.g., defined by the outer surface 45), such that the seal is laterally compressed therebetween when the light pipe 32 is installed on the body 28. According to another exemplary embodiment, the lower portion 58 of the seal 30 may define a thickness greater than the space between an upper surface of the shoulder 26 and a lower edge of the flange 60, such that the seal is vertically compressed between the flange 60 and the shoulder 26. In each of these configurations, the seal 30 may be compressed and form sealing engagement between the flange 60 and the shoulder 26 and/or between the flange 60 and the body catch 44.

According to an exemplary embodiment, an outer periphery 62 of the seal 30 may define a diameter greater than a diameter of an outer periphery 25 of the shoulder 26, such that the seal 30 extends laterally outward past the shoulder 26. In this configuration, the seal 30 may engage the drain 2 (e.g., at the drain opening 12) when the drain stopper 20 is in the closed position to form a watertight seal therewith. According to another exemplary embodiment, more than one seal 30 may be included, such that at least one seal 30 is disposed between the light pipe 32 and the body 28 for forming a watertight seal to protect the batteries 38 from receiving water and at least one seal 30 is disposed proximate the outer periphery 25 of the shoulder 26 to form a watertight seal with the drain 2.

Each of the seal 30 and the flange 60 may form continuous surfaces proximate the outer periphery 25 of the shoulder 26, such that sealing engagement is formed between the flange 60 and the shoulder 26 around substantially the entire circumference of the shoulder 26. In this configuration, water is prevented from passing between the seal 30 and either of the shoulder 26 and the light pipe 32. The body catch 44 may form a continuous surface proximate substantially the entire circumference of the shoulder 26, such that sealing engagement is formed between the flange 60 and the body catch 44. The light pipe catch 50 may form a continuous surface proximate to a circumference of the body catch 44, such that the light pipe catch 50 is configured to engage the body catch 44 at substantially all points along the circumference of the body catch 44. While FIG. 4 shows that each of the shoulder 26, seal 30, body catch 44, and light pipe catch 50 are substantially circular, according to another exemplary embodiment, each may form another shape (e.g., ellipse, rectangle, hexagon, etc.), such that they are configured to engage each other.

Figure 7:
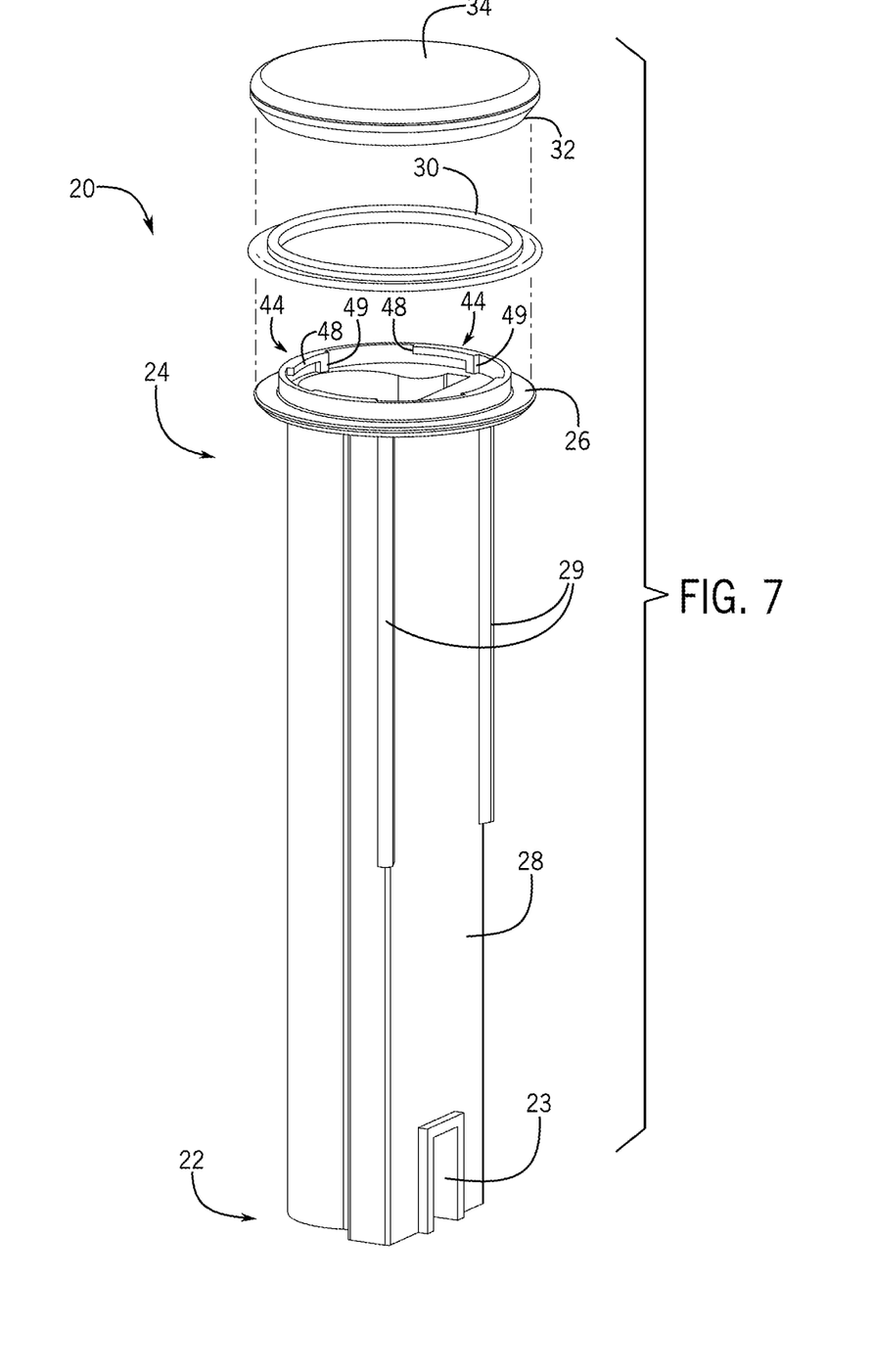
FIG. 7 is an exploded view of the illuminated drain stopper of FIG. 4, according to an exemplary embodiment.

According to another exemplary embodiment, the light pipe catch 50 defines a plurality of spaced apart light pipe catches 50 that are configured to engage the body catch 44 at a plurality of locations along the circumference of the body catch 44. According to yet another exemplary embodiment, the body catch 44 defines a plurality of spaced apart body catches 44 that do not form a continuous surface proximate the circumference of the shoulder 26. Referring now to FIG. 7, an exploded view of the drain stopper 20 is shown according to an exemplary embodiment. As shown in FIG. 7, the drain stopper 20 includes a body catch 44 with one or more separate lateral portions 48 extending generally inward from the vertical portion 46 that forms a complete circumference for the body catch 44. Each lateral portion 48 is configured to engage a light pipe catch 50 with an interference fit.

Where the drain stopper 20 includes a body catch 44 having more than one lateral portions 48, the body catch 44 sealingly engages the seal 30 at substantially all points around its circumference, but engages the light pipe 32 with an interference fit only at the lateral portions 48. According to an exemplary embodiment, a space between adjacent lateral portions 48 may be greater than a length (e.g., arc length) of a corresponding light pipe catch 50, such that the light pipe catch 50 may be received between the adjacent lateral portions 48 for installation of the light pipe 32 on the body 28. A stop 49 (i.e., end portion, barrier, etc.) disposed at an end thereof, extending between each lateral portion 48 and the upper surface 27 of the shoulder 26. The stops 49 are configured to restrict rotation of the light pipe 32 but restricting movement of the light pipe catches 50 in the space (i.e., detent) defined between the lateral portion 48 of the body catch 44 and the upper surface 27 of the shoulder 26. For example, in the configuration shown in FIG. 7, when the light pipe 32 is installed on the upper end 24 of the body 28, the light pipe catches 50 are received in the spaces between adjacent lateral portions 48. The light pipe 32 may be rotated clockwise relative to the upper surface 27 of the shoulder 26 such that the lateral portions 54 of the light pipe catches 50 are received in corresponding detents defined by the lateral portions 48 of the body catch 44. The light pipe 32 may be rotated until a side of at least one of the light pipe catches 50 engages a stop 49. According to other exemplary embodiments, the stops 49 may be positioned such that the light pipe 32 is rotated counter-clockwise to engage the stops 49.

According to an exemplary embodiment, the detent formed by the lateral portion 48 of the body catch 44 may be substantially planar. According to another exemplary embodiment, the detent may define an inclined plane for threaded engagement with the light pipe 32. In this configuration, as the light pipe 32 is rotated relative to the upper surface 27 of the shoulder 26, the light pipe catches 55 threadably engage the lateral portions 48 of the body catch 44, such that the seal 30 is further compressed vertically. While FIG. 7 shows a body catch 44 defining four separate lateral portions 48, according to other exemplary embodiments, more or fewer lateral portions 48 may be defined. According to an exemplary embodiment, the number of light pipe catches 50 may correspond with (e.g., be the same as) the number of lateral portions 48 of the body catch 44.

The light pipe 32 defines a substantially hemispherical void 64 at a central portion thereof, although the void 64 may define other shapes according to other exemplary embodiments. The light source 40 is disposed at a central location of the upper end 24 of the body 28 and within the void 64. Light emanating from the light source 40 enter the light pipe 32 through walls defining the void 64, and the light is transferred (i.e., reflected, refracted, etc.) through the light pipe 32 to an outer periphery thereof. For example, the light pipe 30 is configured to transfer light from the light source 40 internally located in a watertight position within the drain stopper 20 to a location outside the drain stopper 20 (e.g., the sink 4). The light pipe 32 may be formed from a semi-translucent acrylic, although according to other exemplary embodiments, the light pipe 32 may be formed from other materials and/or having other levels of transparency configured to transfer light therethrough (e.g., clear plastic, polycarbonate, etc.).

Referring to FIGS. 4-6, the cover 34 may be disposed on the upper surface 35 of the light pipe 32. The cover 34 defines a lower surface 37 having a complementary shape to the upper surface of the light pipe 32 and is received thereon. The cover 34 may be coupled (i.e., joined) to the upper surface 35 of the light pipe 32 with adhesives or in other ways, such that the cover 34 is either permanently or removably coupled to the light pipe 32. For example, at least one of the light pipe 32 and the cover 34 may include a catch and a complementary feature configured to engage the catch with an interference fit. According to another exemplary embodiment, the cover 34 may define a flange at an end thereof configured to engage a corresponding recess (i.e., inset portion) in the light pipe 32. According to yet another exemplary embodiment, the cover 34 may be crimped onto the light pipe 32.

The cover 34 may be formed from stainless steel, molded plastic or other material resistant to degradation by water. The material of the cover 34 may be selected to provide a desired aesthetic appearance. For example, the cover 34 may be formed from a generally opaque (i.e., solid) material, such that light does not pass vertically upward from the light pipe 32 through the cover 34. As discussed above, the placement of the opaque cover 34 above the light pipe 32 restricts the direction of light reflecting out from the light pipe 32, generating a ring of light about the drain 2 without illuminating the entire sink 4 or surrounding area.

Figure 8:
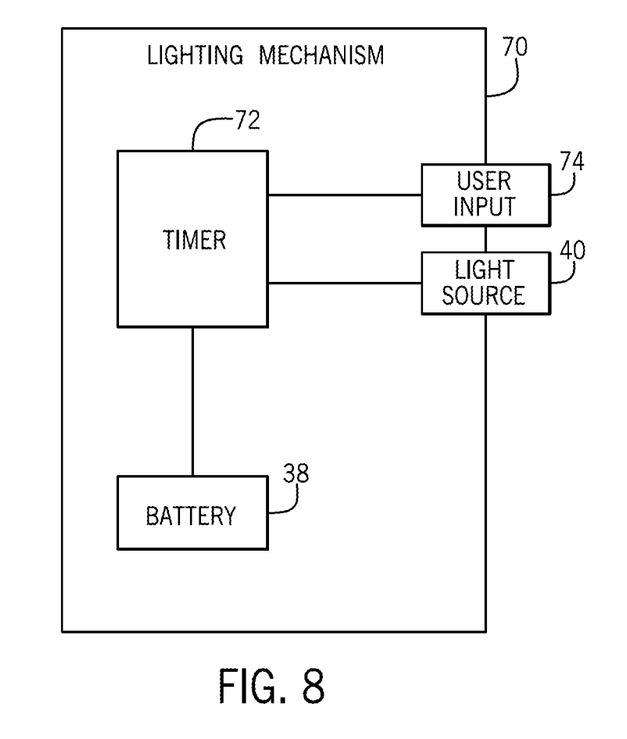
FIG. 8 is a block diagram of a lighting mechanism, according to an exemplary embodiment.

Referring to FIG. 8, a block diagram of a lighting mechanism 70 is shown according to an exemplary embodiment. The lighting mechanism 70 is controlled by a timer 72. According to an exemplary embodiment, the timer 72 does not include a clock. The timer 72 functions to turn on the light source 40 for a first period of time (e.g., 1 hour, 2 hours, 3 hours, 4 hours, etc.). The designated period of time may be set by a user or may be pre-determined by other factors (e.g., set by the manufacturer). For example, the designated time period may be set for operation generally at night. After the expiration of the first period of time, the timer 72 turns off the light source 40 for a second period of time. According to an exemplary embodiment, the second period of time may be calculated by subtracting the first period of time from 24 hours, such that the light source 40 turns on and off at substantially the same time and for the same first period of time every day.

According to an exemplary embodiment, a user may program the first time period to a desired length through interaction with a user input 74. The user input 74 may include an on/off button and/or a multi-input switch (e.g., a multi-position sliding switch where each position indicates a different first period of time, a button that is pressed to cycle through a set of pre-set first periods of time, etc.). According to an exemplary embodiment, during setup of the lighting mechanism 70, if the user input 74 includes a multi-position sliding switch, the user slides the switch into the position corresponding to the desired first period of time. If the user input 74 includes a button used to set the desired first period of time, the user presses the button a designated number of times. For example, if the timer 72 is configured in one-hour intervals, the user may press the button six times to set the designated period of time as six hours. Alternatively, if the timer 72 is configured with a number of re-set time periods (e.g., one hour, three hours, six hours, etc.), each press of the button cycles through a pre-set period.

The lighting mechanism 70 may or may not include a display. In configurations where the lighting mechanism 70 does not include a display, the lighting mechanism 70 may be configured to pulse the light source 40 to indicate the first period of time selected by the user. Each pulse may indicate the number of hours selected for the first period (e.g., the light source 40 will pulse three times if the user selects a three-hour first period). After the user selects the desired first period of time, the user may interact with the on/off button to indicate when the light source 40 should first be powered on and the daily cycle begun. According to an exemplary embodiment, the user may later press the on/off button again to change the daily start time of the first period. According to another exemplary embodiment, if the user presses and holds the on/off button for a certain amount of time (e.g., three seconds), the programming of the timer 72 may be reset and the light source 40 may remain off until the lighting mechanism 70 is reprogrammed. In this configuration, the lighting mechanism 70 may be configured to pulse the light source 40 to indicate that the timer 72 has been reset. According to another exemplary embodiment, the timer 72 includes a clock, such that the user may program a window of operation by selecting an on time and an off time through interaction with the user input 74. According to another exemplary embodiment, the light source 40 may be turned on or off based on sensor feedback. For example, the sensor may be an ambient light sensor, such that the light source 40 is switched on in low ambient light situations an off in high ambient light situations. Other sensors may include motion detectors, such that the light source 40 is switched on for a period of time after motion has been detected.

According to an exemplary embodiment, when the batteries 38 near the end of their lives and require replacement, the lighting mechanism 70 may be configured to pulse the light source 40 to alert the user of a low battery level condition. According to another exemplary embodiment, the lighting mechanism 70 may be configured to change the color of the light source 40 (e.g., to red from another color) under a low battery level condition.

Figure 9:
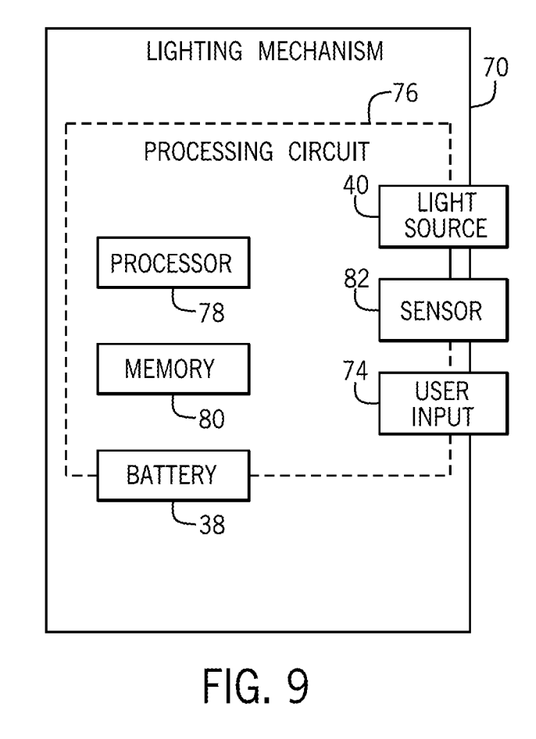
FIG. 9 is a block diagram of a lighting mechanism, according to another exemplary embodiment.

Referring to FIG. 9, a block diagram of a lighting mechanism 70 is shown according to another exemplary embodiment. In this configuration, the lighting mechanism 70 includes a processing circuit 76. The processing circuit 76 includes a processor 78 and memory 80. The memory 80 stores programming instructions that, when executed by the processor 78, control the operation of the lighting mechanism 70. The processing circuit 76 is in electrical communication with the light source 40 and the batteries 38. In this configuration, the batteries 38 may provide operational power to the processing circuit 76. To the extent that the lighting mechanism 70 includes a sensor 82 and/or a user input 74 (e.g., an on/off button and/or a multi-input switch, etc.), the processing circuit 76 may be connected thereto.

The processing circuit 76 is configured to turn the light source 40 on and off based on a user-programmed schedule, a user-programmed time interval, and/or feedback from the sensor 82. For example, the processing circuit 76 may be programmed to control the light source 40 in the same manner as discussed with respect to the timer 72. The processing circuit 76 may also be programmed to turn on and off the light source 40 based on the time of day and/or based on feedback from the sensor 82. The sensor 82 may be an ambient light sensor configured to provide a feedback signal to the processing circuit 76. In this configuration, the processing circuit 76 turns on the light source 40 when the ambient light falls below a threshold level and turns off the light source 40 when the ambient light is above the threshold level. According to another exemplary embodiment, the sensor 82 may be a motion detector configured to provide a feedback signal to the processing circuit 82 when motion is detected. For example, the motion detector may be a passive infrared motion detector, an ultrasound motion detector, or any other suitable type of detector. In this configuration, the processing circuit 76 is configured to activate the light source 40 after motion has been detected and deactive the light source 40 after no motion has been detected for a pre-set period of time (e.g., five minutes). According to another exemplary embodiment, the light source 40 may be activated only when the sensor 82 is triggered during the first period of time.

While FIGS. 8 and 9 show the lighting mechanism 70 including a user input 74, according to another exemplary embodiment, the lighting mechanism 70 may be operated without a user input 74. In this configuration, the first period of time for the light source 40 to operate may be pre-set by the manufacturer. The daily cycle of the lighting mechanism 70 begins operation upon completion of a circuit. For example, with respect to FIG. 8, the first period of time may begin when the batteries 38 are electrically connected to the timer 72 and the light source 40. With respect to FIG. 9, the first period of time may begin when the batteries 38 are electrically connected to the processing circuit 76. In either configuration, the lighting mechanism 70 is configured to begin the first period of time at the time of day when the circuit is completed, such that the first period begins and ends at substantially the same time every day. In this configuration, a user may specify the desired daily start time of operation of the drain stopper 20 as a night light by completing the circuit at the desired start time. In this configuration, in order to change the start time of the first period, the user may remove the batteries 38 (i.e., disconnect them from the circuit) and reinsert them at the new desired start time.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An illuminated drain stopper, comprising:
   a body comprising an upper end and a lower end;
   a light pipe disposed at the upper end of the body; and
   a cover disposed at an upper surface of the light pipe opposite the body and extending at least partially over an edge of the light pipe;
   wherein the light pipe is configured to transfer light from a light source within the body to an outer periphery of the light pipe and to reflect light laterally outward.

2. The illuminated drain stopper of claim 1, further comprising:
   a shoulder extending laterally outward from the body proximate the upper end of the body; and
   a body catch extending vertically upward from the shoulder.

3. The illuminated drain stopper of claim 2, further comprising a light pipe catch extending vertically downward from the light pipe, the light pipe catch configured to engage the body catch.

4. The illuminated drain stopper of claim 2, further comprising a seal disposed on the upper end of the body;
   wherein the seal defines a substantially L-shaped cross section;
   wherein an upper portion of the seal extends vertically upward along the body catch; and
   wherein a lower portion of the seal extends laterally outward along the shoulder.

5. The illuminated drain stopper of claim 4, further comprising a flange extending downward from an outer periphery of the light pipe;
   wherein the lower portion of the seal is vertically compressed between the flange and the shoulder.

6. The illuminated drain stopper of claim 4, further comprising a flange extending downward from an outer periphery of the light pipe;
   wherein the upper portion of the seal is laterally compressed between the flange and the body catch.

7. The illuminated drain stopper of claim 1, wherein the light pipe engages the body with an interference fit.

8. The illuminated drain stopper of claim 1, wherein the light pipe threadably engages the body.

9. The illuminated drain stopper of claim 1, wherein the cover is opaque.

10. An illuminated drain stopper, comprising:
    a body comprising an upper end and a lower end;
    a cavity defined in the body and configured to house a battery;
    a light pipe disposed at the upper end of the body and configured to reflect light laterally outward;
    a seal disposed between the light pipe and the body, the seal configured to form a watertight connection between the light pipe and the body; and
    a cover disposed at an upper surface of the light pipe opposite the body and extending at least partially over an edge of the light pipe;
    wherein the light pipe comprises at least one of a transparent material or a translucent material.

11. The illuminated drain stopper of claim 10, further comprising a shoulder extending laterally outward from the body proximate the upper end of the body;
    wherein the seal is disposed on top of the shoulder.

12. The illuminated drain stopper of claim 11, wherein the seal extends laterally outward past the shoulder.

13. The illuminated drain stopper of claim 10, wherein when the light pipe is installed on the body, a circuit is completed with the light source.

14. The illuminated drain stopper of claim 10, wherein the seal and the light pipe enclose the cavity to form a watertight enclosure.

15. A sink drain assembly, comprising:
    a sink basin defining a drain; and
    a drain stopper disposed in the drain, the drain stopper comprising:
      a body;
      a light pipe disposed at an upper end of the body, the light pipe configured to transfer light from a light source in the body to an outer periphery of the light pipe; and
      a cover disposed at an upper surface of the light pipe opposite the body;
      wherein the light pipe is configured to reflect light laterally outward toward the sink basin; and
      wherein the cover extends at least partially over an edge of the light pipe.

16. The sink drain assembly of claim 15, further comprising a seal disposed between the body and the light pipe.

17. The sink drain assembly of claim 16, wherein the drain stopper is configured to move vertically within the drain between an open position and a closed position; and
    wherein when the drain stopper is in the closed position, the seal sealingly engages the drain.

18. The sink drain assembly of claim 17, wherein when the drain stopper is in the closed position, the light pipe is configured to transfer light to the sink from within the body.

19. The sink drain assembly of claim 17, further comprising:
    an inset portion formed in the body; and
    a valve stem disposed in the drain, the valve stem engaging the inset portion;
    wherein the valve stem is configured to move the drain stopper between the open and closed positions.

20. The sink drain assembly of claim 15, further comprising a plurality of ribs extending vertically along the body, the plurality of ribs configured to engage walls of the drain, such that the body is offset from the walls.

* * * * *